United States Patent [19]

Pelletier

[11] Patent Number: 4,887,418

[45] Date of Patent: Dec. 19, 1989

[54] APPARATUS FOR MOWING, CHIPPING AND BLOWING

[76] Inventor: Guy Pelletier, Belmont Street, P.O. Box 251, Melbourne, Canada, J0B 2B0

[21] Appl. No.: 214,372

[22] Filed: Jul. 5, 1988

[51] Int. Cl.[4] ................... A01D 34/52; A01D 34/53; A01D 34/54
[52] U.S. Cl. ................... 56/249.5; 56/11.9; 56/249; 56/294; 56/320.2
[58] Field of Search ............ 56/294, 249, 249.5, 56/320.1, 320.2, 10.5, 10.6, 10.7, 11.9

[56] References Cited

U.S. PATENT DOCUMENTS

| | | |
|---|---|---|
| 2,000,249 | 7/1935 | Pew . |
| 2,566,724 | 9/1951 | Heil ................... 56/294 X |
| 2,644,501 | 7/1953 | Perry ................... 56/294 X |
| 2,831,308 | 4/1958 | Raba . |
| 2,923,117 | 2/1960 | Henderson ................... 56/294 |
| 3,029,583 | 4/1962 | Patt . |
| 3,073,100 | 1/1963 | Kingsley . |
| 3,099,124 | 7/1963 | Strasel ................... 56/249 |
| 3,271,939 | 9/1966 | Granger, Jr. et al. ................... 56/294 X |
| 3,292,353 | 12/1966 | Woodring et al. ................... 56/294 |
| 3,685,265 | 8/1972 | Horowitz et al. ................... 56/249 |
| 3,690,047 | 9/1972 | Thoen et al. ................... 56/294 X |
| 3,797,214 | 3/1974 | Erdman et al. ................... 56/320.2 |
| 3,935,695 | 2/1976 | Merry ................... 56/294 |
| 4,008,559 | 2/1977 | Lessig, III et al. ................... 56/320.2 |
| 4,028,868 | 6/1977 | Zehrung, Jr. ................... 56/320.1 X |
| 4,550,554 | 5/1985 | Lundahl et al. . |
| 4,572,258 | 2/1986 | Mischel ................... 56/294 X |

FOREIGN PATENT DOCUMENTS 1001264 8/1965 United Kingdom ................... 56/249

Primary Examiner—George A. Suchfield

[57] ABSTRACT

A power-driven rotor is mounted on a support and its cylindrical wall is provided with helically-arranged, elongated slits in which blades or rasps are removably inserted, the rasps having a series of teeth disposed along portions of helices co-axial with the rotor and protruding from the cylindrical wall. The apparatus is more particularly used as a grass and bush mower, and in a modified embodiment also as an ice- and snow-blower.

19 Claims, 8 Drawing Sheets

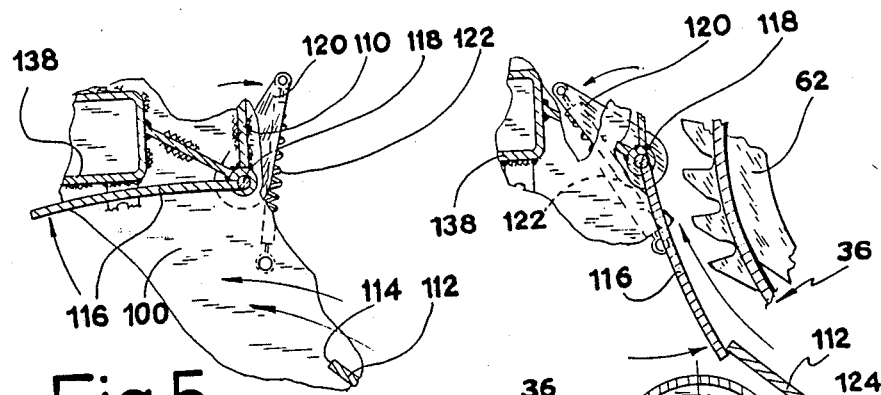
Fig.5
Fig.5a
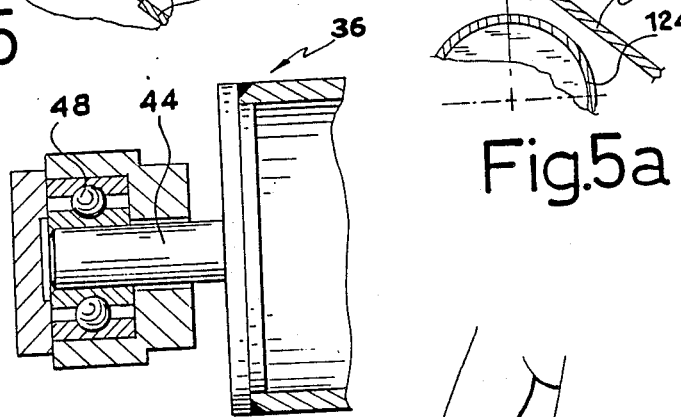
Fig.9
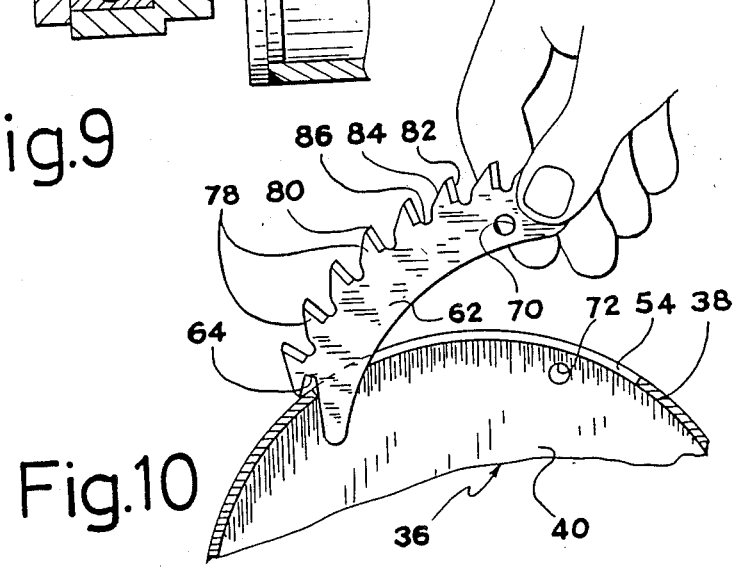
Fig.10

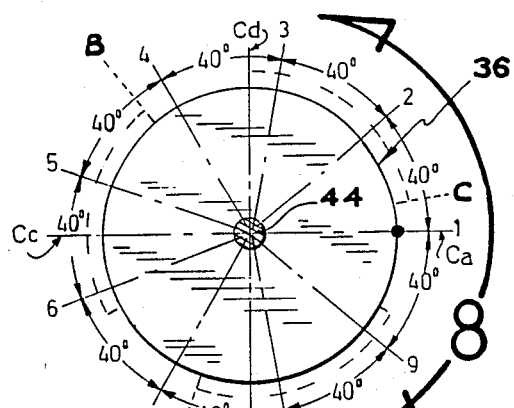
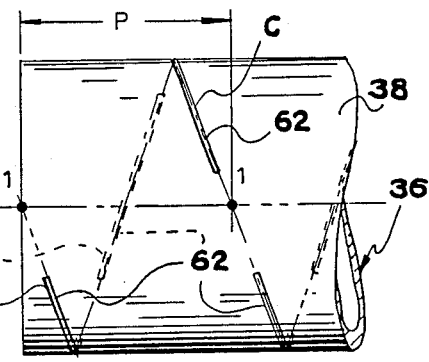
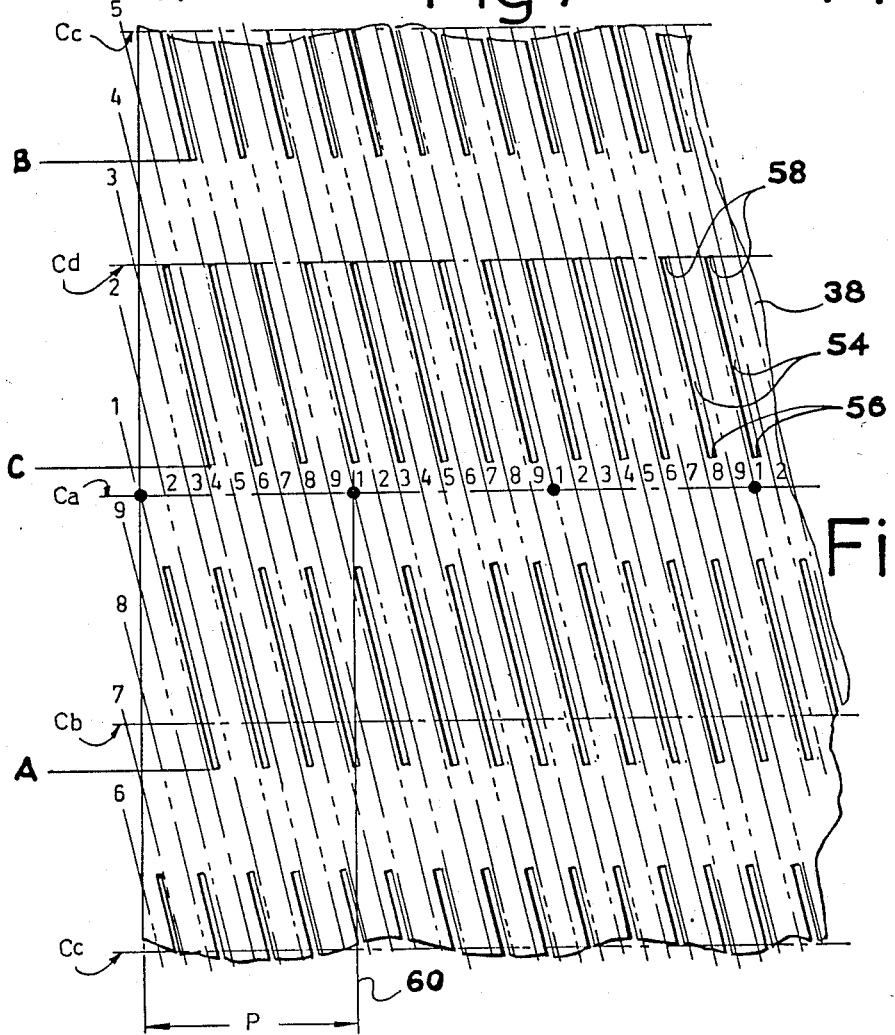

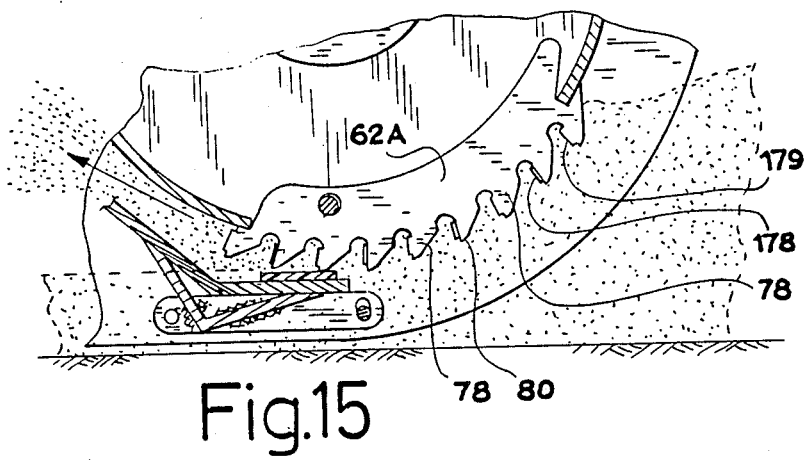
Fig.15
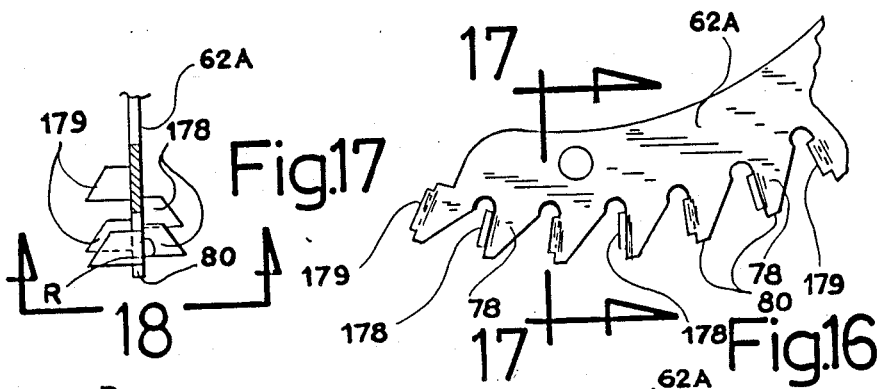
Fig.17
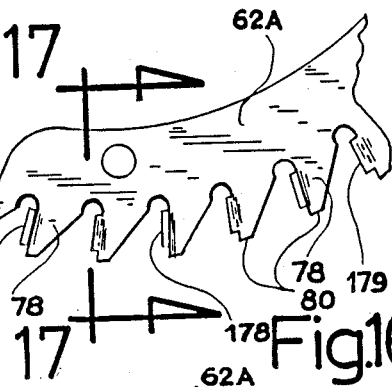
Fig.16
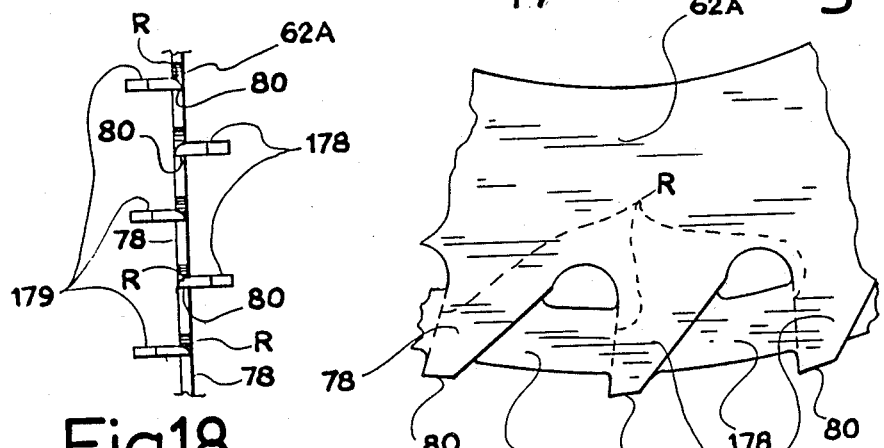
Fig.18
Fig.19

APPARATUS FOR MOWING, CHIPPING AND BLOWING

FIELD OF THE INVENTION

The present invention relates to a multi-purpose comminuting apparatus more particularly adapted for use as a lawn-mower, as a bush-cutter and as a chipper, and which can also be used, when modified, as a snow-blower combined with an ice-chipper.

BACKGROUND OF THE INVENTION

Most conventional lawn-mowers include one or more blades rotatably about a vertical axis in a downwardly-opening casing. Such conventional lawn-mowers require an important amount of energy to cut a given surface of grass of a predetermined height, and the cut grass tends to adhere to the inner surface of the casing, such that cleaning of the casing is frequently required. Moreover, such conventional lawn-mowers require frequent sharpening of the blades, and the latter can be readily damaged by stones or the like present on the lawn. Conventional lawn-mowers cannot cut small diameter trunks, such as bush, and are ineffective in tall grass.

It is known to provide wood chippers used in the wood industries to convert tree trunks and branches into wood chips. Such wood chippers include specially-designed teeth removably fixed at the periphery of a rotor. Each tooth, when damaged or when requiring sharpening, must be individually removed and fixed back to the rotor, a time-consuming operation.

In the snowblower field, a large screw is often used for engaging and conveying the snow to an ejector impeller, this screw being sometimes provided at its peripheral edge with permanently-fixed ice-engaging teeth. Such arrangements are not suitable for cutting grass and the like flexible material.

OBJECTS OF THE INVENTION

The main object of the present invention is to provide a lawn-mower which obviates the above-noted disadvantages of conventional lawn-mowers and, more precisely, which requires much less expense of energy for the same amount of mowing; which automatically expels the cut grass or other material; which can cut bush as well as grass in a single pass; and which can cut tall grass in a single pass.

Another object of the present invention is to provide an apparatus of the character described, which can also be used as a chipper of wood, plastics and the like solid material.

Another object of the present invention is to provide a mower of the character described and which can be easily modified to be used as a snowblower with ice-comminuting capability.

Another object of the present invention is to provide a lawn-mower of the character described, provided with a casing arranged such that the cut grass, or the like material, can be ejected directly at the back of the mower or at the front thereof, depending on the requirements.

Another object of the invention is to provide a lawn-mower of the character described, in which the grass can be cut at an adjusted length.

Another object of the invention is to provide an apparatus of the character described, in which the cutting blades can be quickly and easily removed for replacement or sharpening, whenever required.

SUMMARY OF THE INVENTION

The apparatus of the invention includes a support, a power-driven rotor rotatably mounted on the support, the rotor having a cylindrical wall provided with helically-arranged elongated slits, blades removably inserted in the slits and protruding from said cylindrical wall, the blades each having a series of teeth disposed along a portion of an helix co-axial with the rotor and fixing means to releasably fix the blades to the rotor. Preferably, each tooth is radially outwardly inclined in the rotational direction of the rotor. Preferably, the slits are arranged in sets with the leading and trailing ends of the slits of each set respectively located at one of two angularly-spaced generatrices of said cylindrical wall. Preferably, the leading tooth of each blade overlaps in the rotational direction of the rotor, the trailing tooth of a blade of a leading set of blades, so that the teeth of all the blades will continuously sweep the entire surface to be attacked by the teeth. Preferably, the fixing means includes a notch at one end of each blade to receive the exposed portion of the cylindrical wall at the corresponding end of the slit, and a rod, parallel to the rotor axis, removably extending through said rotor and through aligned holes made in the set of blades near their other end. Preferably, there are three sets of slits and associated sets of blades, and the rods are substantially, angularly, equally spaced from each other and at the same radial distance from the rotor axis. Preferably, the rotor includes end caps which are removably fitting the ends of the cylindrical wall and the rods also retain the end caps in position against the cylindrical wall. The end caps are preferably provided with a radially-inwardly-facing peripheral step, which overlaps the cylindrical wall at the end of the latter, in order to resist centrifugal force.

When the apparatus is used as a lawn-mower, there is provided a shoe plate disposed parallel to the rotor axis and in sliding contact with the teeth, so as to effect a scissor action on the material to be cut or chipped.

When the apparatus is used as a chipper, there is provided a support plate having an edge substantially parallel to the rotor axis and close to said teeth, said support plate being transversely radial to the rotor axis, and further including pusher means to push the material on said support plate towards said teeth to be comminuted by the latter.

When the apparatus is to be used as a lawn-mower and bush-cutter, the support is in the form of a casing having end walls on the outside of the ends of the rotor, the rotor rotatably supported by said end walls, the casing further having a transverse wall joining the end walls and spacedly overlying the teeth and locally diametrically opposite the plate shoe, and the casing being adapted to be attached to the front of a motor vehicle, with the motor axis substantially parallel to the ground and with the plate shoe close to the ground and transverse to the long axis of the vehicle, the rotor being rotated in such a direction that its blades move from said transverse wall towards said plate shoe.

Preferably, a ground-engaging roller is adjustably carried by the casing, so as to adjust the level of the rotor above ground. Preferably, the rear of the casing forms a rearwardly-opening duct for the direct discharge of the cut material. Preferably, there is a partition in the duct, at the back of the rotor and provided with an aperture closable by a deflector plate. The partition defines a passage running from said shoe plate around the back and top of the rotor. When the deflector plate is opened, the cut material is ejected at the back of the casing, and when the deflector plate is closed, the material is ejected above the rotor and forwardly of the casing.

Finally, there is preferably provided a cover hinged at the front of the transverse wall and openable to have access to the rotor and to cause ejection of the material directly forwardly of the rotor.

BRIEF DESCRIPTION OF THE DRAWINGS

FIGS. 5 and 5a are partial cross-sections of a part of FIG. 2 and showing the deflector plate in open and closed position, respectively;

FIG. 6, shown on the fifth sheet of drawings, is a partial schematic elevation showing one group of slits and blades defining a complete spiral around the rotor;

FIG. 7 is a schematic end elevation of the rotor shown in FIG. 6;

FIG. 8 is a partial developed plan view of the arrangement of the slits at the cylindrical wall of the rotor;

FIG. 9, shown on the fourth sheet of drawings, is a partial longitudinal section of another manner of mounting the rotor;

FIG. 10 is a partial cross-section of the rotor showing how a blade is inserted in a slit thereof;

FIG. 15 is a partial cross-section, similar to FIG. 2, but showing a modified blade, the teeth of which are provided with extensions used as impellers;

FIG. 16 is a partial side elevation of the modified blade;

FIG. 17 is a cross-section along line 17—17 of FIG. 16;

FIG. 18 is a top plan view taken along line 18 of FIG. 17; and

FIG. 19 is a partial side elevation of the modified blade prior to bending of the extensions.

DETAILED DESCRIPTION OF THE PREFERRED EMBODIMENTS

Figure 1:
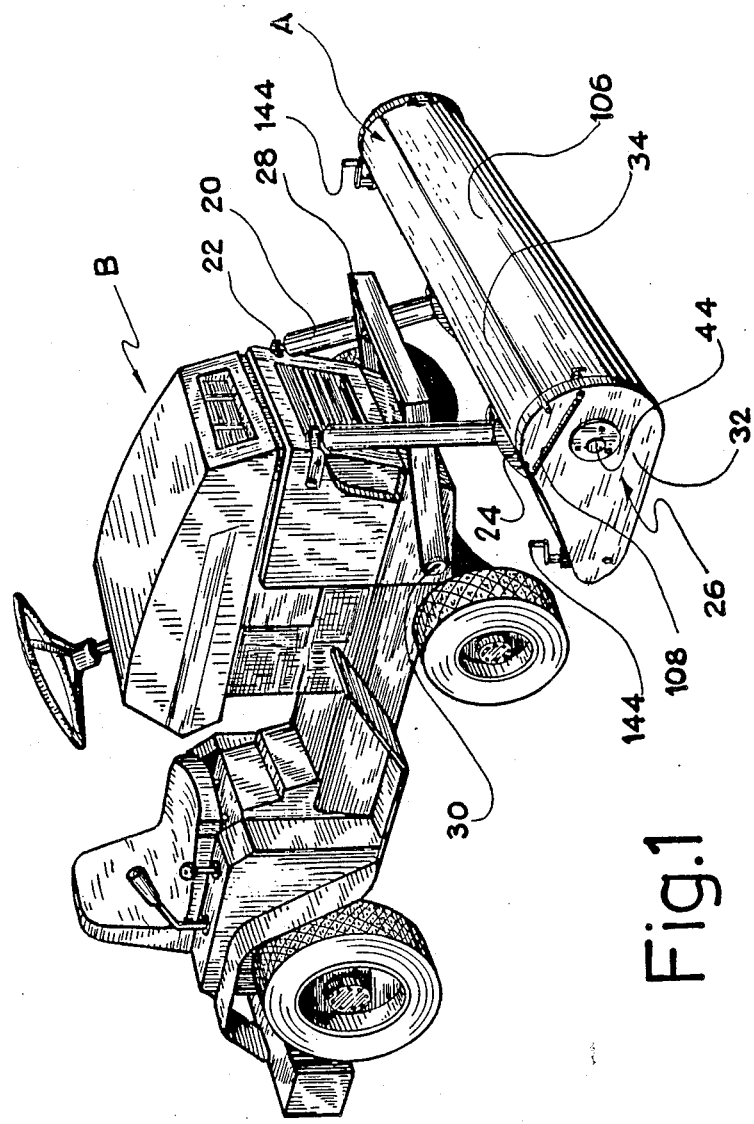
FIG. 1 is a perspective view of the apparatus used as a lawn-mower and mounted at the front of a motor vehicle.

FIG. 1 shows the apparatus of the invention, generally indicated at A, used as a lawn-mower and mounted at the front of a vehicle B as by means of struts 20 pivoted at 22 to the front of the vehicle, and at their lower end pivoted to brackets 24 extending rearwardly from the casing 26 of apparatus A. Struts 20 may be pivotally connected intermediate their ends to a yoke 28 extending across the front of vehicle B and pivoted at 30 to the vehicle body. Any other type of mounting the apparatus in front of the vehicle B to be pushed thereby can be provided.

Figure 2:
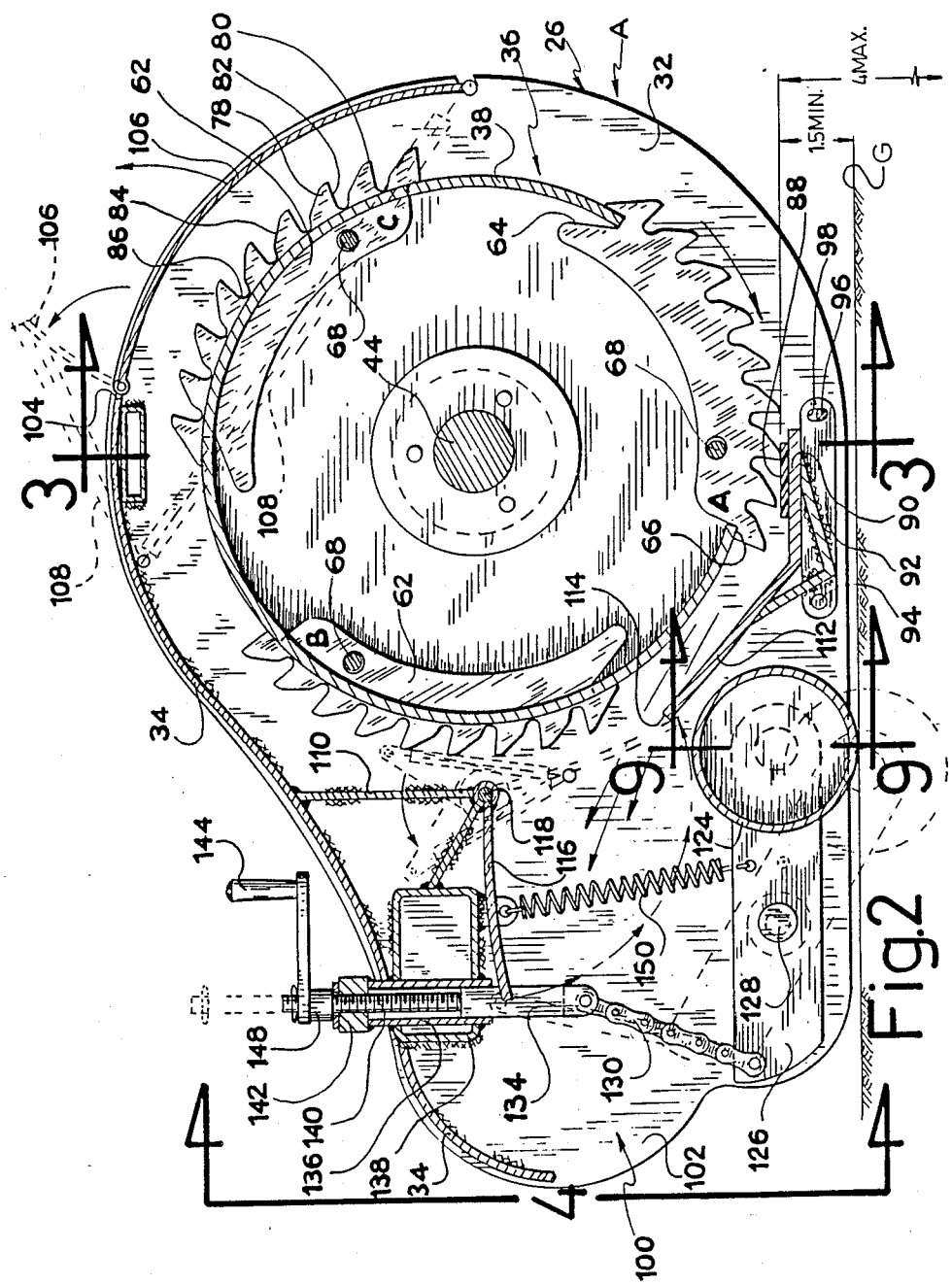
FIG. 2 is a cross-section of the apparatus of FIG. 1, this cross-section being taken along line 2—2 of FIG. 4.

As shown in FIGS. 1 and 2, the casing 26 includes end walls 32 joined by a transverse wall 34 at the top of the casing. A rotor 36 is rotatably mounted within the casing 26. Rotor 36 is journalled in the end walls 32. It comprises a cylindrical wall 38 supported at its ends on end caps 40. One end cap 40 is keyed at 42 to a shaft 44, which supports and rotates the rotor 36. The shaft 44 has at its other end a flange 46 which is bolted to the associated end cap 40. Shaft 44 is journalled into the two end walls 32 of the casing 26 by means of bearings 48. A hydraulic motor 50 is secured by bolts 52 to one end wall 32 on the outside thereof and its output shaft is splined within the end of shaft 44. Thus, the rotor 36 can be driven in rotation by the hydraulic motor 50, which is supplied by hydraulic fluid by a suitable hydraulic pump, not shown, carried by the vehicle B. Obviously, a mechanical drive could be derived from the vehicle B to the rotor 36.

The rotor 36, when looked at in FIG. 2, is driven in clockwise direction.

The cylindrical wall 38 thereof is provided with a plurality of slits 54, as shown in FIG. 8. Slits 54 are arranged in sets, preferably three sets, around the rotor. The slits of each set are substantially aligned transversely of the rotor, with their leading ends 56 disposed along a first generatrix of the rotor and their trailing ends 58 disposed about a second generatrix of the cylindrical wall 38. The slits 34 are of substantially equal length, extending through about 40 degrees around the cylindrical wall 38. The slits are equally inclined at about 12 degrees with respect to the longitudinal axis of the rotor 36. There are three sets of slits 54, equally angularly spaced around the rotor. With this arrangement, the intervening portion of the cylindrical wall 38 between each set of slits is sufficiently wide to provide a strong wall. In the example shown, there are sufficient slits in each set to provide a nine-entry arrangement, as indicated by numbers 1 to 9 repeating themselves just above the horizontal line Ca in FIG. 8. The arrangement is preferably such that, as shown in FIG. 6, any selected slits of the three sets form a complex helix in alignment around the cylindrical wall. The slits are also so arranged that referring to FIG. 8, and more particularly as indicated by the vertical line 60, the leading ends 56 of the slits 54 of a given set overlap in the rotational direction of the rotor the trailing ends 58 of the slits of a leading set.

A blade, or rasp 62, is removably inserted and retained in each slit 54. Each rasp 62 is of similar size and shape, as more particularly shown in FIG. 2. The rasps 62 in FIG. 2 are indicated as A, B, and C, corresponding to the same arrangement as shown in FIG. 6, so as to form a complete spiral around the rotor. Each rasp 62 is formed of flat stock; is longitudinally straight, of elongated shape. Each rasp 62 has a notch 64 at its trailing end and an inwardly-facing step 66 at its leading end. It is a simple matter to insert a rasp 62 within any given slit 54, as shown in FIG. 10, by holding the rasp and inserting the trailing end of the rasp within the slit and in such a way that the notch 64 fits around the portion of the wall 38 defining the trailing end 58 of the slit 54. Then the step 66 is made to abut the outer surface of the cylindrical wall 38 at the leading end 56 of the slit 54. In operative position, the rasp partially protrudes inside the rotor and also outside of the rotor. It is releasably retained in operative position by means of a transverse rod 68 extending through aligned holes 70 of the rasps 62 inserted in one set of slits 54 and through aligned holes 72 made in the end caps 40. In this manner, the rasps are positively retained against centrifugal force, it being realized that the rotor, of about one and a half foot in diameter, is designed to rotate at about between 1800 and 2000 r.p.m.

Figure 3:
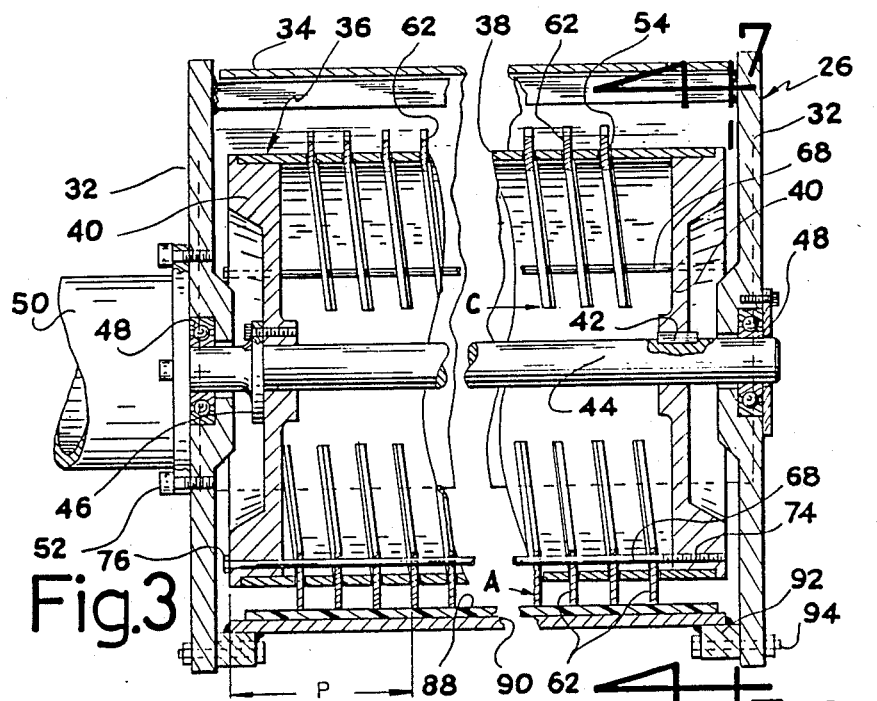
FIG. 3 is a longitudinal section, partially broken, and taken along line 3—3 of FIG. 2.
Figure 4:
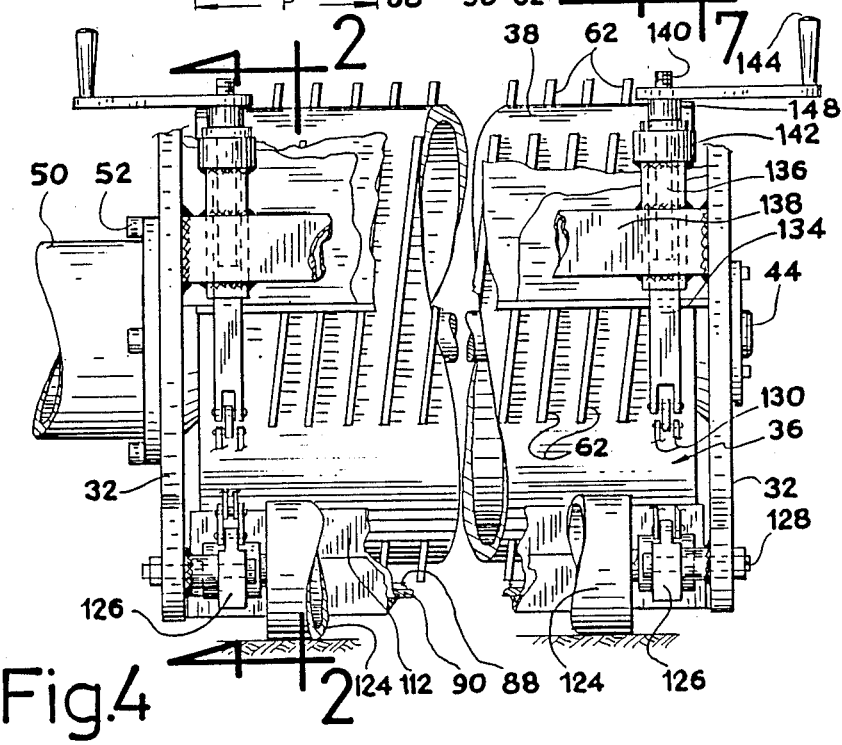
FIG. 4 is a rear end elevation, partially broken, and taken along line 4—4 of FIG. 2.

The retaining rods 68, as shown in FIG. 3, are also used to retain in position the assembly of the end caps 40 and the cylindrical wall 38 when the end caps are removable from the cylindrical wall. In this case, the rods 68 have a threaded end 74 screwed within one end cap and a nut-shaped head 76 at the other end.

The rods 68 are angularly, equally spaced around the rotor and are at the same radial distance from the rotor axis. Each rasp 62 is provided with outwardly-projecting teeth 78. Each tooth 78 has a tip 80 from which inwardly extends a straight cutting edge 82 which is inclined at about 80 degrees with respect to the center of rotation of the rotor in the direction of rotor rotation. Each tooth has a trailing inclined edge 84 which is substantially straight and is such that a straight line extended therefrom will meet the cutting edge 82 of the next trailing tooth 78 above the trough 86 between two teeth 78. With this arrangement, it has been found that the rotor teeth do not become clogged with cut grass, and rotation of the rotor will forcibly eject the cut grass in the direction of rotor rotation.

Referring to FIGS. 2 and 3, it is seen that casing 26 maintains the rotor at a certain distance above ground G. The end walls 32 have a front portion which is generally circular and co-axial with the rotor axis and which protrudes radially outwardly from the tips 80 of the teeth 78. These tips 80 are all disposed at an equal radial distance from the rotor axis, and when rotating, come in sliding contact with a plate shoe 88 disposed substantially parallel to the rotor axis and tangent to the tooth tips 80.

The plate shoe can be made of a plastic material and is supported by a transverse support plate 90 extending between the two end walls 32 and fixed to end levers 92 pivoted to the end walls at 94. Preferably, the end levers 92 are adjustably fixed by bolt 96 extending through a slot 98 of the end levers; but the levers can be simple brackets permanently fixed to the end walls of the casing. Thus, grass or any other material to be cut, and which abuts the plate shoe 88 during forward movement of the apparatus, will be engaged by the rotating teeth in a scissor-like action.

The end walls 32 form a rearward extension, and together with a rear extension of the transverse wall 34, form a rearwardly-directed duct 100, which is open at its rear end, as shown at 102, for the rearward ejection through opening 102 of the material cut by the rotor teeth.

The transverse wall 34 extends spacedly over the rotor and define a front edge 104 which is about diametrically opposite to plate shoe 88. Along this front edge 104, is pivotally mounted a cover 106 which is curved to conform to the front portion of the end walls and which is pivotable between a closed position, shown in FIG. 2 in full line, in which the front portion of the casing is only partially open to receive grass or the like to be cut, and an open position, partially shown in dotted line in FIG. 2, to gain access to the rotor and to the rasps 62 for ease of maintaining said rasps either for sharpening of their teeth or complete replacement of one or more rasps.

The cover 106 is resiliently retained at each end in either one of closed or open position by means of a tension spring 108 arranged in toggle-like fashion and attached to the casing at one end and to the cover at the other end.

A partition, made of two sections, transversely extends between the two end walls 32 and are fixed to said end walls at the rear of the rotor. This partition comprises an upper section 110, in the form of a flat plate, and a lower section 112 which forms a continuation of the support plate 90 for the plate shoe 88. The partition 110, 112 defines between themselves an aperture 114 which is closable by a deflector plate 116 pivoted at 118 along the lower edge of the upper partition section 110. To each end of the pivot shaft of the deflector plate 116 is secured a lever 120 (see FIGS. 5 and 5a) to which is attached a toggle spring 122, the other end of the tension spring being attached to an end wall 34. Thus, the two tension springs 122 resiliently maintains the deflector plate 116 in open or closed position. In open position, aperture 114 allows direct ejection of the material through the duct 100 and then through opening 102 to the outside of the casing. In the closed position of the deflector plate 116, as shown in FIG. 5a, there is formed a continuous passage between the rotor and the partitions 110 and 112 and deflector plate 116, which starts at the shoe 88 and extends around the rotor to open at the front edge of the closed cover, so that the material may be discharged ahead of the apparatus and recuperated in a bag installed in front of the mower.

The level of the rotor above ground can be adjusted so as to cut the grass to the required length. For this purpose, a roller 124 extends transversely of the casing behind the rotor and below the same, being journalled at its two ends to levers 126. Each lever 126 is pivoted intermediate its ends at 128 to an end wall 32 just inside the same, and the rear end of lever 126 is attached by means of a flexible link, such as a bicycle chain 130, to the lower end of a plunger 134, which is guided for up-and-down movement in a sleeve 136 fixed in upright position in the casing, and more particularly through a transverse reinforcing tube 138 fixed to the end walls.

Plunger 134 is rotatably attached to a screw 140, which is screwed within a nut 142 fixed to the top end of the sleeve 136. Rotation of the screw 140, by means for instance of handle 144, will adjust the level of the plunger 134 and, consequently, the level of the roller 124 with respect to the rotor 36. The two handles 144 are rotated to the same extent, so as to ensure that the casing be transversely levelled with respect to the ground. As an alternate manner, the two hubs 148 of the handles 144 could be arranged as sprockets with an endless chain trained on said sprockets, so that rotation of one or the other of the handles 144 will displace the two plungers 134 to the same extent up or down. In order to maintain the link 130 in taut condition, a tension spring 150 is connected to each lever 126 intermediate the roller 124 and the pivot 128 and is also connected at its top end to the reinforcing tube 138.

Figure 11:
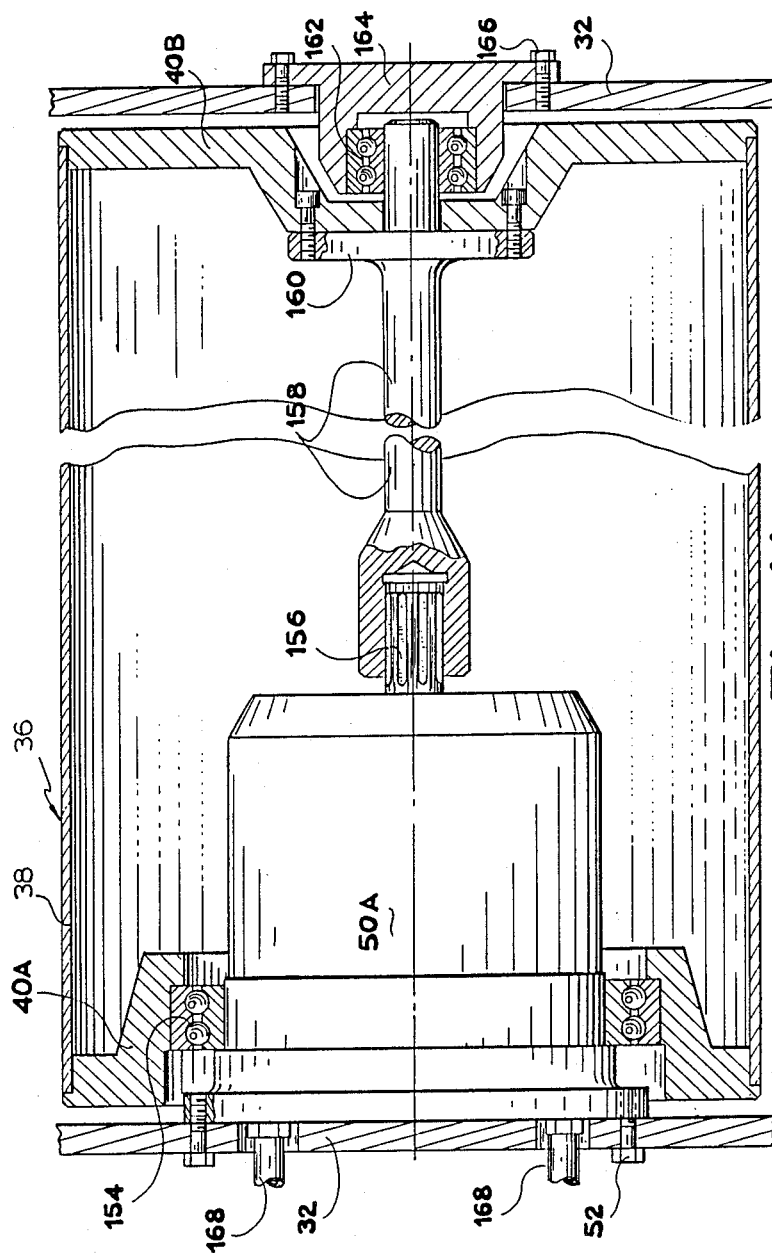
FIG. 11 is a longitudinal section of the rotor showing one manner of mounting the driving motor inside the rotor.
Figure 12:
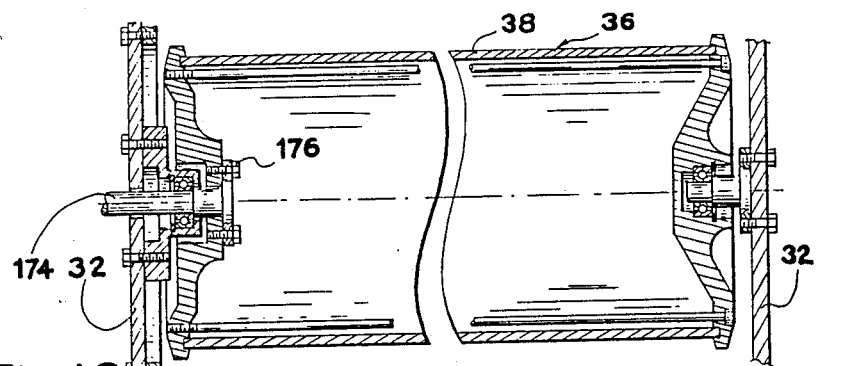
FIG. 12 is a longitudinal section of the rotor showing how it is mounted in the casing when the driving motor is on the outside.
Figure 13:
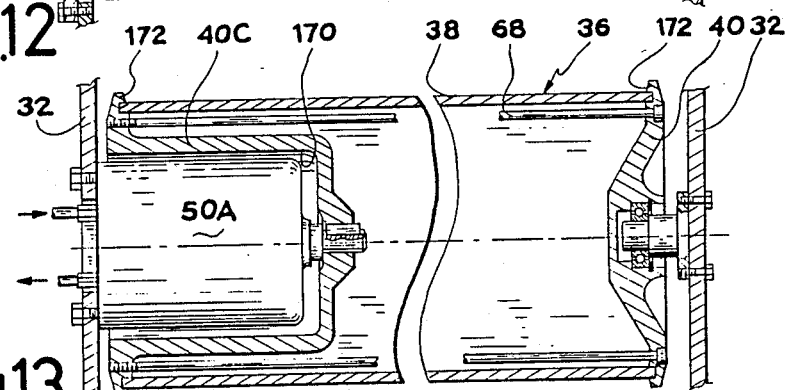
FIG. 13 is a view similar to that of FIG. 11, but showing another manner of mounting the driving motor inside the rotor.

FIG. 3 shows an arrangement where both ends of the rotor are driven by a hydraulic motor 50, the latter being mounted on the outside of the casing. FIGS. 11, 12, and 13 show alternate arrangements in which the rotor is driven from only end and in which the driving hydraulic motor may be mounted directly within the rotor.

Referring to FIG. 11, the hydraulic motor 50A is fixed by bolts 52 to an end wall 32 inside the casing and extends within the rotor, one end cap of which being modified, as shown at 40A, to provide a sufficient opening for insertion of the motor 50A, the end cap rotatably journalled on the rotor by a large diameter ball bearing arrangement 154. The output shaft 156 of the motor 58A is removably splined into an end of a shaft 158, which has a collar 160 removably bolted to the other end cap 40B. The shaft 158 is journalled in a bearing 162 carried by a plug 164 secured within a hole made in the other end wall 32 of the casing by bolts 166. By unbolting motor 50A and unscrewing its hydraulic hoses 168, and also by removing the plug 164, the assembly of the motor and rotor can be easily extracted from the front end of the casing. The motor is protected against damage and does not form a protuberance externally of the casing.

FIG. 13 shows an alternate arrangement wherein one end cap 40C forms a deep recess 170, in which the internally-mounted hydraulic motor 50A is freely inserted, the output shaft of said motor being directly keyed in a hole in the bottom of recess 170. This figure also shows that the end caps are provided with an inwardly-facing step 172 at their periphery, overlapping the end of the cylindrical wall 38 of the rotor to prevent disengagement under centrifugal force, if found necessary.

FIG. 12 shows another embodiment in which the rotor is driven from one end with the driving motor or gear at the outside of the casting 26. The arrangement is very similar to that of FIG. 13 as far as the right-hand side of the rotor is concerned; but the end cap on the left-hand side is modified so as to secure the drive shaft 174 to the end cap by bolts 176.

It has been found that the apparatus just described, when used as a lawn-mower to cut grass, will expend about 40% of the energy required by conventional lawn-mowers with blades rotatable about a vertical shaft, cutting grass of the same height and about the same width of cut.

It has been found that the grass is constantly ejected clear of the casing, either through its front opening or its rear opening, depending on the position of the deflector plate. The inside of the casing and the teeth of the rasps never becomes clogged. Also high grass can be cut in a single pass. Also, whenever the rotor encounters small-diameter bush, it will chip the bush clean into wood chips.

The rasp teeth normally simply ride over rocks or pebbles lying in the grass and will not become damaged by the same.

Referring to FIGS. 15 to 19, the rasp 62 may be modified, as shown at 62A, with the steel of each tooth 78 being only partially punched out and remaining attached to the tooth at the otherwise cutting edge to form a part 178, 179 which is then bent at right angles to the rasp successively in opposite directions, so as to act as a snow impeller. The top outward edge of the bent part 178, 179 will not extend to the tip 80 of the tooth, so that the latter will be able to engage and cut ice, which will be comminuted, and the ice and snow thrown out of the casing by the impellers 178, 179. Impellers 178, 179 may extend on only one side of the blade and/or be formed at only every third tooth, if so desired.

It is to be noted that, because the rasps 62 can be easily removed and replaced, it is a simple matter to have rasps of different kinds, that is with different types of teeth, even carbide teeth, to adapt the rotor to various kinds of works, such as wood chipping, and chipping of other types of materials including plastic.

Figure 14:
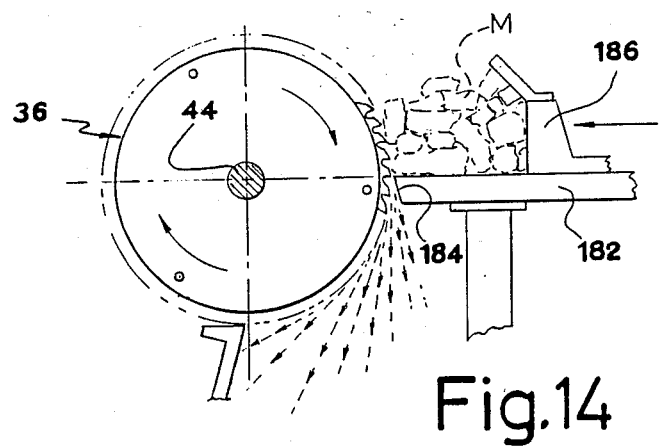
FIG. 14 is a schematic end view of a rotor used as a chipper.

The rotor can be mounted, as shown in FIG. 14, with material M to be chipped located on a table 182 transversely disposed along a radius of the rotor and having a front edge 184 disposed parallel to the rotational axis of the rotor and close to the tip 80 of the teeth. Material M is pushed over the teeth to be comminuted by means of a pusher 186. Thus, it is apparent that the rotor assembly, including the rasps 62, can be put to different uses for cutting or comminuting different types of material.

I claim:

1. An apparatus for use as a mower or chipper, comprising:
a support, a power-driven rotor rotatably mounted on said support, said rotor having a cylindrical wall provided with helically-arranged, elongated slits, blades removably inserted in said slits and protruding from said cylindrical wall, each blade having a series of teeth disposed along a portion of a helix co-axial with said rotor, and fixing means to releasably fix said blades to said rotor.

2. An apparatus as defined in claim 1, wherein each tooth is radially outwardly inclined in the rotational direction of said rotor.

3. An apparatus as defined in claim 2, wherein each slit and each blade has a leading and a trailing end, and said slits are arranged in sets with the leading and trailing end of the slits of each set, respectively located at one of two angularly-spaced generatrices of said cylinder wall, the blades inserted in a set of slits forming a set of blades, and the leading end of each blade of the set is similarly located at a generatrix of said cylindrical wall.

4. An apparatus as defined in claim 3, wherein the leading tooth of each blade of one set of blades overlaps, in the rotational direction of said rotor, the trailing tooth of a blade of a leading set of blades.

5. An apparatus as defined in claim 4, wherein said fixing means inludes a notch at one end of said blades to receive the exposed portion of said cylindrical wall at the corresponding end of said slits, and a rod, parallel to the rotor axis, removably extending through said rotor and through aligned holes made in said set of blades near their other end.

6. An apparatus as defined in claim 5, wherein said notches are formed at the trailing end of said blades and said holes are formed near the leading end of said blades.

7. An apparatus as defined in claim 6, wherein there are at least three sets of slits and associated sets of blades, and wherein said rods are substantially, angularly, equally spaced from each other and at the same radial distance from the rotor axis; and wherein said rotor has end caps removably fitting the ends of sid cylindrical wall, said rods also releasably retaining said end caps against the ends of said cylindrical wall.

8. An apparatus as defined in claim 7, wherein said end caps have a radially-inwardly-facing peripheral step overlapping said cylindrical wall at the ends of the latter.

9. An apparatus as defined in claim 1, further including a plate shoe fixed relative to said support and extending substantially parallel to said rotor axis and substantially transversely tangent to said teeth.

10. An apparatus as defined in claim 1, further including a fixed material support plate having an edge substantially parallel to said rotor axis and close to said teeth, said support plate being transversely radial to said rotor axis, and further including pusher means to push the material on said support plate towards said teeth to be comminuted by the latter.

11. An apparatus as defined in claim 9, wherein said support is a casing having end walls on the outside of the ends of said rotor, said rotor rotatably supported by said end walls, said casing further having a transverse wall joining said end walls and spacedly overlying said teeth and diametrically opposite to said plate shoe, and means to attach the back of said casing to the front of a motor vehicle with said rotor axis substantially parallel to the ground and with said plate shoe close to the ground and transverse to the longitudinal axis of said vehicle, said rotor rotated in a direction so that its blades move from said transverse wall towards said plate shoe.

12. An apparatus as defined in claim 11, wherein said transverse wall has a front edge disposed diametrically opposite said plate shoe, and further including a cover hinged to said casing at said front edge and pivotable between a closed position forming a front extension of said transverse wall and covering a front portion of said rotor, and an open position uncovering said front portion of said rotor, and cover-retaining means to releasably retain said cover in either one of said two positions.

13. An apparatus as defined in claim 12, wherein said casing forms a material-ejecting duct extending at the back of said rotor and open at the rear, a transverse partition in said duct defining a passage around the back of said rotor from said shoe plate and opening at said front edge, said partition having an aperture making communication between said passage and the back portion of said duct to permit comminuted material entrained by said rotor through said passage to be ejected through said duct, and further including a deflector plate pivoted within said duct for movement between a first position closing said aperture, and a second position opening said aperture, and deflector plate-retaining means to releasably retain said deflector plate in either one of its two positions.

14. An apparatus as defined in claim 12, wherein said cover-retaining means and said deflector plate-retaining means each includes a toggle tension spring attached to said casing and one to said cover and the other to said deflector plate.

15. An apparatus as defined in claim 11, further including a ground-engaging roller carried by said casing at the back of said rotor and extending parallel to said rotor axis, and roller adjustment means to adjust the level of said roller relative to said rotor to adjustably vary the clearance of said rotor above ground.

16. An apparatus as defined in claim 15, wherein said roller adjustment means include a pair of levers, each pivoted to an end wall intermediate its ends, the ends of said roller journalled in one end of said levers, an adjustable plunger carried by said casing near each end wall and a link interconnecting said plunger to the other end of said lever.

17. An apparatus as defined in claim 1, wherein said rotor has end caps fixed to said cylindrical wall, said support being a casing having end walls on the outside of said end caps, one end cap journalled in a related end wall, the other end cap forming a recess opening outwardly to the end of said rotor, and a rotor driving motor having a housing freely extending within said recess and having a drive shaft fixed to at least one of said other end caps, said motor housing fixed to the related end wall.

18. An apparatus as defined in claim 1, wherein at least some of said teeth form transverse extensions acting as impellers.

19. An apparatus as defined in claim 18, wherein each transverse extension has a radially outer edge which is inward of the tip of the tooth having said extension.

* * * * *